(12) United States Patent
Mangus et al.

(10) Patent No.: US 11,072,355 B2
(45) Date of Patent: Jul. 27, 2021

(54) SYSTEM AND METHODS FOR DETECTING SURGE IN AN ENGINE SYSTEM

(71) Applicant: Transportation IP Holdings, LLP, Norwalk, CT (US)

(72) Inventors: Michael Mangus, Raleigh, NC (US); James Robert Mischler, Erie, PA (US); Samuel Lyle Hazen, Mayville, NY (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 47 days.

(21) Appl. No.: 16/192,506

(22) Filed: Nov. 15, 2018

(65) Prior Publication Data

US 2020/0156675 A1   May 21, 2020

(51) Int. Cl.
| | |
|---|---|
| *B61L 3/00* | (2006.01) |
| *F02D 41/22* | (2006.01) |
| *F02D 41/00* | (2006.01) |
| *F02M 26/08* | (2016.01) |
| *F02B 37/00* | (2006.01) |
| *F02B 37/16* | (2006.01) |

(52) U.S. Cl.
CPC .............. *B61L 3/006* (2013.01); *B61L 3/008* (2013.01); *F02B 37/004* (2013.01); *F02B 37/16* (2013.01); *F02D 41/0007* (2013.01); *F02D 41/22* (2013.01); *F02M 26/08* (2016.02)

(58) Field of Classification Search
CPC ......... B61L 3/006; B61L 3/008; F02M 26/08; F02B 37/004; F02B 37/16; F02D 41/0007; F02D 41/22

USPC ......................................................... 701/101
See application file for complete search history.

(56) References Cited

U.S. PATENT DOCUMENTS

| | | | | |
|---|---|---|---|---|
| 5,798,941 A * | 8/1998 | McLeister | .............. | G05B 11/42 415/1 |
| 6,298,718 B1 * | 10/2001 | Wang | ...................... | F02D 41/22 73/114.01 |
| 7,529,614 B1 * | 5/2009 | Muller | .................... | F02B 37/18 701/102 |
| 8,095,294 B1 * | 1/2012 | Griffiths | .............. | F02D 41/0027 701/103 |
| 8,452,515 B2 * | 5/2013 | Drohan | .................. | G05B 13/04 701/100 |
| 9,228,525 B2 * | 1/2016 | Nistler | ................ | F02D 41/2416 |
| 2009/0198432 A1 * | 8/2009 | Tabata | ................ | F02D 41/0007 701/103 |

(Continued)

*Primary Examiner* — Logan M Kraft
*Assistant Examiner* — John D Bailey
(74) *Attorney, Agent, or Firm* — McCoy Russell LLP (57) ABSTRACT

Various methods and systems are provided for detecting surge of a turbocharger during engine operation. As one example, a system includes an engine coupled to a low pressure turbocharger and a high pressure turbocharger; and a controller with non-transitory instructions stored in memory that when executed during operation of the engine cause the controller to: indicate an occurrence of surge of the high pressure turbocharger in response to a deviation of a modeled speed of the high pressure turbocharger from a measured speed of the high pressure turbocharger by a threshold amount, where the modeled speed tracks the measured speed during non-surge conditions, as engine operating conditions change.

19 Claims, 4 Drawing Sheets

(56) References Cited

U.S. PATENT DOCUMENTS

| | | | |
|---|---|---|---|
| 2011/0044794 A1* | 2/2011 | Ono | F01K 25/00 415/36 |
| 2011/0283976 A1* | 11/2011 | Schaffeld | F02D 41/0007 123/564 |
| 2013/0219881 A1* | 8/2013 | Moriguchi | F02B 37/18 60/603 |
| 2015/0089940 A1* | 4/2015 | Sivasubramaniam | F02D 41/0072 60/602 |
| 2015/0369149 A1* | 12/2015 | Matsubara | F02D 41/0007 701/103 |
| 2016/0061104 A1* | 3/2016 | Hirayama | F02B 37/004 60/602 |
| 2016/0265468 A1* | 9/2016 | Takayanagi | F02B 37/18 |
| 2016/0341136 A1* | 11/2016 | Joshi | F02D 41/0007 |
| 2017/0370280 A1* | 12/2017 | Lock | F02B 37/007 |
| 2018/0023490 A1* | 1/2018 | Beno | F04D 27/0284 701/102 |
| 2018/0355876 A1* | 12/2018 | Sase | F02B 37/12 |
| 2019/0226390 A1* | 7/2019 | McConville | F04D 27/0207 |

\* cited by examiner

SYSTEM AND METHODS FOR DETECTING SURGE IN AN ENGINE SYSTEM

BACKGROUND

Technical Field

Embodiments of the subject matter disclosed herein relate to two-stage turbocharger engine system and detection of compressor surge of a turbocharger in the two-stage turbocharger engine system.

Discussion of Art

An engine system mPray include a two-stage turbocharger system including a low pressure turbocharger and high pressure turbocharger arranged in series with one another. In some embodiments, the engine system may additionally include an exhaust gas recirculation system that recirculates exhaust gases to an intake of the engine system. During operation of the engine system, compressor surge of a compressor of the high or low pressure turbocharger may occur, thereby causing vibration and an increase in turbocharger speed. Compressor surge is undesirable, as it may reduce engine efficiency and result in degradation of turbocharger components.

BRIEF DESCRIPTION

In one embodiment, a system comprises an engine coupled to a low pressure turbocharger and a high pressure turbocharger; and a controller with non-transitory instructions stored in memory that when executed during operation of the engine cause the controller to: indicate an occurrence of surge of the high pressure turbocharger in response to a deviation of a modeled speed of the high pressure turbocharger from a measured speed of the high pressure turbocharger by a threshold amount, where the modeled speed tracks the measured speed during non-surge conditions, as engine operating conditions change.

DETAILED DESCRIPTION

The following description relates to embodiments of a system including an engine coupled to a low pressure turbocharger and a high pressure turbocharger; and a controller with non-transitory instructions stored in memory that when executed during operation of the engine cause the controller to: indicate an occurrence of surge of the high pressure turbocharger in response to a deviation of a modeled speed of the high pressure turbocharger from a measured speed of the high pressure turbocharger by a threshold amount, where the modeled speed tracks the measured speed during non-surge conditions, as engine operating conditions change. In one example, the system further includes an exhaust gas recirculation (EGR) system and the low pressure turbocharger and high pressure turbocharger are arranged in series with one another.

Figure 1:
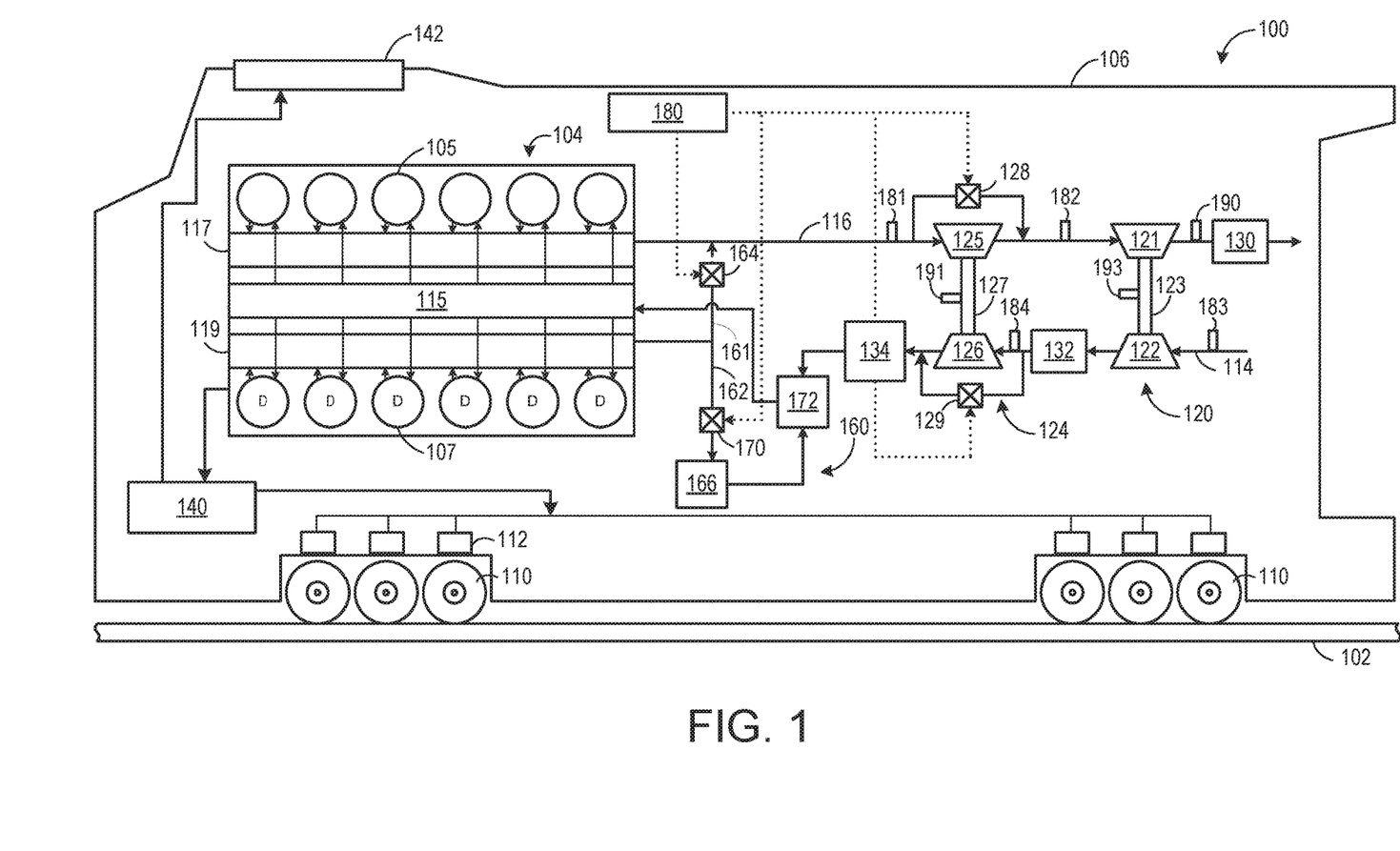
FIG. 1 shows a schematic diagram of an example rail vehicle with an engine.
Figure 3:
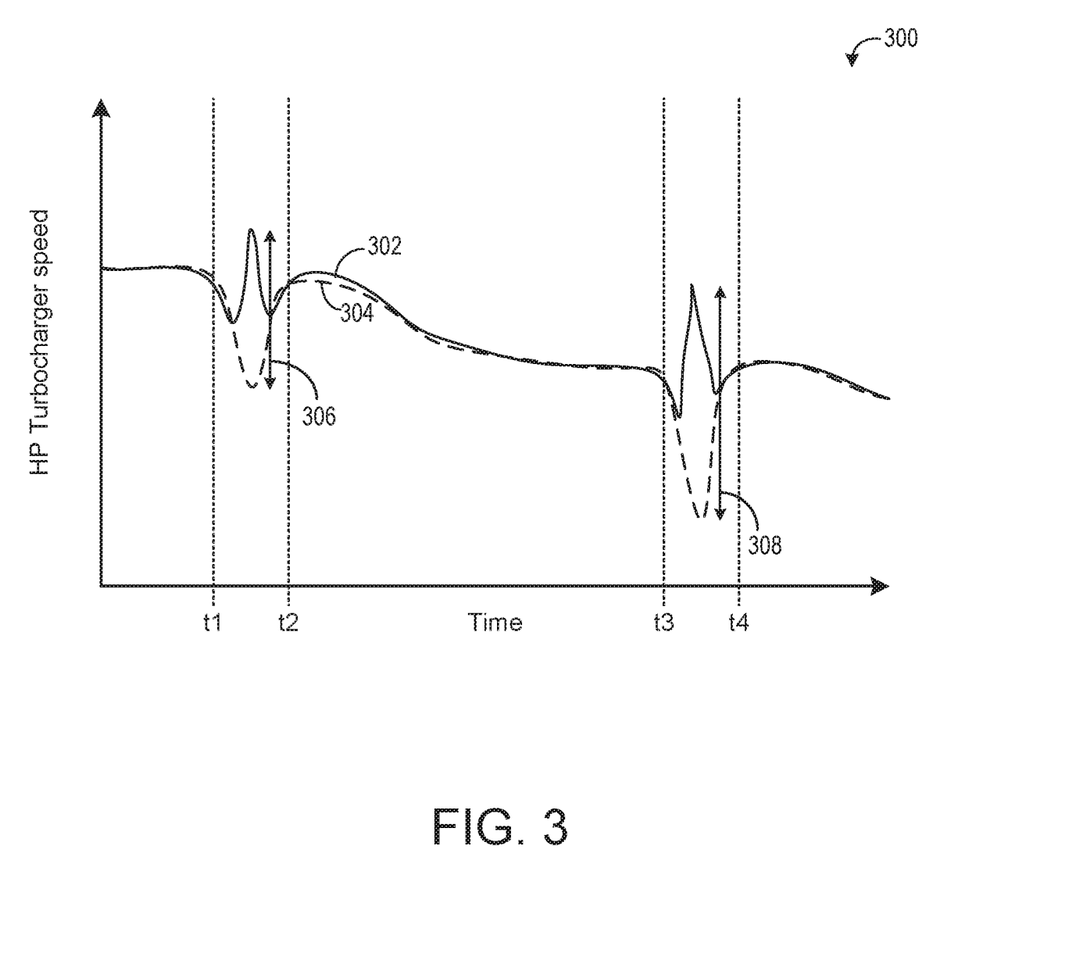
FIG. 3 shows an example graph of a measured and a modeled high pressure turbocharger speed during operation of an engine.
Figure 4:
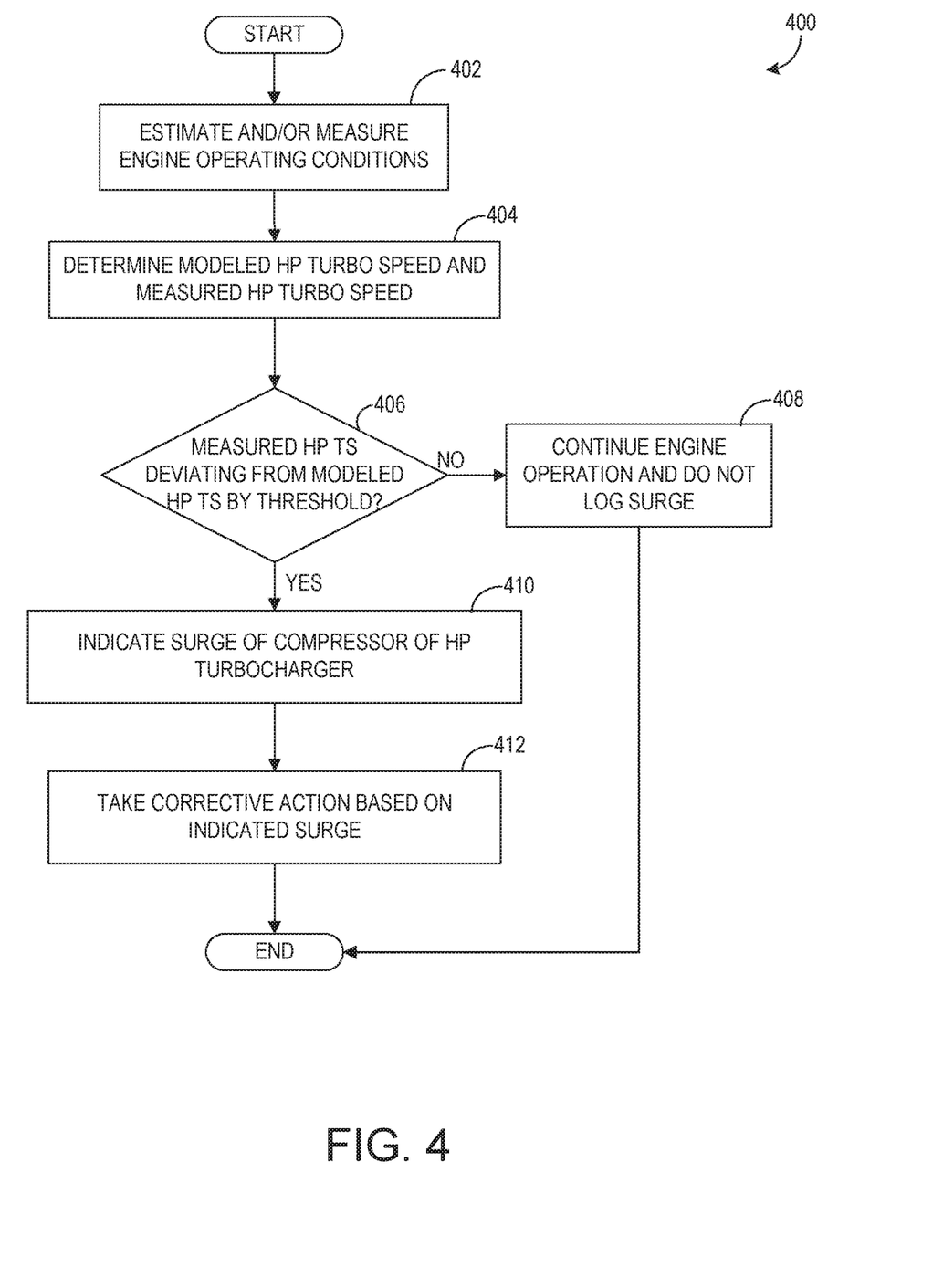
FIG. 4 shows a flow chart of a method for detecting surge in a high pressure turbocharger system.

An example system including a low pressure turbocharger, high pressure turbocharger, and high pressure EGR system is shown in FIG. 1. In such an engine system, it may be difficult to detect surge of a compressor of the high pressure turbocharger. In particular, due to the complexities of the air handling system of the engine system, including the two-stage turbocharger system and the high pressure EGR system, surge events may go undetected, thereby decreasing engine efficiency and increasing a likelihood of degradation of the two-stage turbocharger system. Further, if surge events are not logged when they occur, the engine may not be properly diagnosed and serviced when off-line. In one example, an engine simulation model, which may include a physics-based model of an air handling system of the engine, may be stored as executable code in memory of an engine controller and executed during operation of the engine to determine a modeled speed of the high pressure turbocharger. The model, such as the example model shown in FIG. 2, may utilize current estimated and/or measured conditions of the engine, including inlet and outlet pressures and temperatures of the high pressure turbocharger, as inputs and then output the modeled speed. The modeled speed may be compared to a measured speed of the high pressure turbocharger (e.g., measured via speed sensor). As shown in the example graph of FIG. 3, during non-surge conditions, while the engine is operating, the modeled high pressure turbocharger speed tracks the measured high pressure turbocharger speed. In this way, the modeled high pressure turbocharger speed reflects the actual speed of the high pressure turbocharger when the high pressure compressor is not experiencing surge. However, during surge events of the high pressure turbocharger, the modeled speed deviates from the measured speed, as seen in FIG. 3. This deviation represents an error in the modeled speed which may be detected and then used to indicate the occurrence of surge, as shown in the method of FIG. 4. As a result, surge events may be more easily detected during operation of the engine and corrective action may be taken to reduce surge.

While the approach herein may be described with reference to detecting surge in a compressor of a high pressure turbocharger, a similar approach may be used to detect surge in a compressor of a low pressure turbocharger. For example, using the methods described herein, surge may be detected in a low or high pressure turbocharger of an engine system including a two-stage turbocharger system. Additionally, the approach described herein may be similarly implemented in a single-turbocharger system (e.g., a single-stage turbocharger system).

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for detecting compressor surge in a high pressure compressor of a high pressure turbocharger of an engine system, an example of a platform is disclosed in which the engine system may be installed in a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle includes an engine 104. In other non-limiting embodiments, the engine may be a stationary engine, such as in a power-plant application, or an engine in a marine vessel or off-highway vehicle propulsion system as noted above. In one embodiment herein, the engine is a multi-fuel engine operating with diesel fuel and natural gas, but in other examples the engine may use various combinations of fuels other than diesel and natural gas.

The engine receives intake air for combustion from an intake, such as an intake manifold 115. The intake may be any suitable conduit or conduits through which gases flow to enter the engine. For example, the intake may include the intake manifold, an intake passage 114, and the like. The intake passage receives ambient air from an air filter (not shown) that filters air from outside of a vehicle in which the engine may be positioned. Exhaust gas resulting from combustion in the engine is supplied to an exhaust, such as exhaust passage 116. The exhaust may be any suitable conduit through which gases flow from the engine. For example, the exhaust may include an exhaust manifold 117, the exhaust passage, and the like. Exhaust gas flows through the exhaust passage, and out of an exhaust stack of the rail vehicle. In one example, the engine is a diesel engine that combusts air and diesel fuel through compression ignition. In other non-limiting embodiments, the engine may combust fuel including gasoline, kerosene, biodiesel, or other petroleum distillates of similar density through compression ignition (and/or spark ignition).

In one embodiment, the rail vehicle is a diesel-electric vehicle. As depicted in FIG. 1, the engine is coupled to an electric power generation system, which includes an alternator/generator 140 and electric traction motors 112. For example, the engine is a diesel engine that generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of a plurality of wheels to provide tractive power to propel the rail vehicle. One example configuration includes one traction motor per wheel. As depicted herein, six pairs of traction motors correspond to each of six pairs of wheels of the rail vehicle. In another example, alternator/generator may be coupled to one or more resistive grids 142. The resistive grids may be configured to dissipate excess engine torque via heat produced by the grids from electricity generated by alternator/generator.

In the embodiment depicted in FIG. 1, the engine is a V-12 engine having twelve cylinders. In other examples, the engine may be a V-6, V-8, V-10, V-16, I-4, I-6, I-8, opposed 4, or another engine type. As depicted, the engine may include a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders. In yet another embodiment, the engine may not include any donor cylinders and instead include only non-donor cylinders. In another embodiment, exhaust gas recirculation (EGR) may be provided from a bank of cylinders supplying a manifold with exhaust and then this exhaust may be supplied to an air intake. In some embodiments, all cylinders of the engine may selectively provide EGR to an engine intake passage via an EGR system, as explained further below.

As depicted in FIG. 1, the non-donor cylinders are coupled to the exhaust passage to route exhaust gas from the engine to atmosphere (after it passes through an optional exhaust gas treatment system 130 and first and second turbochargers 120 and 124). The donor cylinders, which provide engine exhaust gas recirculation (EGR), are coupled exclusively to an EGR passage 162 of an EGR system 160 which routes exhaust gas from the donor cylinders to the intake passage of the engine, and not to atmosphere. By introducing cooled exhaust gas to the engine, the amount of available oxygen for combustion is decreased, thereby reducing combustion flame temperatures and reducing the formation of nitrogen oxides (e.g., NOR).

Exhaust gas flowing from the donor cylinders to the intake passage passes through a heat exchanger such as an EGR cooler 166 to reduce a temperature of (e.g., cool) the exhaust gas before the exhaust gas returns to the intake passage. The EGR cooler may be an air-to-liquid heat exchanger, for example. In such an example, one or more charge air coolers 132 and 134 disposed in the intake passage (e.g., upstream of where the recirculated exhaust gas enters) may be adjusted to further increase cooling of the charge air such that a mixture temperature of charge air and exhaust gas is maintained at a desired temperature. In other examples, the EGR system may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage rather than the intake passage.

Additionally, as shown in FIG. 1, the EGR system includes an EGR bypass passage 161 that is configured to divert exhaust from the donor cylinders back to the exhaust passage. The EGR bypass passage may be controlled via a first valve 164. The first valve may be configured with a plurality of restriction points such that a variable amount of exhaust is routed to the exhaust, in order to provide a variable amount of EGR to the intake.

The EGR passage 162 may selectively route exhaust to the intake via a second valve 170. For example, when the second valve is open, exhaust may be routed from the donor cylinders to the EGR cooler and/or additional elements prior to being routed to the intake passage.

The first valve and second valve may be on/off valves controlled by the control unit 180 (for turning the flow of EGR on or off), or they may control a variable amount of EGR, for example. In some examples, the first valve may be actuated such that an EGR amount is reduced (exhaust gas flows from the EGR passage to the exhaust passage). In other examples, the first valve and/or second valve may be actuated such that the EGR amount is increased (e.g., exhaust gas flows from the exhaust passage to the intake passage).

In such a configuration, the first valve 164 is operable to route exhaust from the donor cylinders to the exhaust passage of the engine and the second valve 170 is operable to route exhaust from the donor cylinders to the intake passage of the engine. As such, the first valve may be referred to as an EGR bypass valve, while the second valve may be referred to as an EGR metering valve. In the embodiment shown in FIG. 1, the first valve and the second valve may be engine oil, or hydraulically, actuated valves, for example, with a shuttle valve (not shown) to modulate the engine oil. In some examples, the valves may be actuated such that one of the first and second valves is normally open and the other is normally closed. In other examples, the first and second valves may be pneumatic valves, electric valves, or another suitable valve.

As shown in FIG. 1, the vehicle system further includes an EGR mixer 172 which mixes the recirculated exhaust gas with charge air such that the exhaust gas may be evenly distributed within the charge air and exhaust gas mixture. In the embodiment depicted in FIG. 1, the EGR system is a high-pressure EGR system which routes exhaust gas from a location upstream of the turbochargers in the exhaust passage to a location downstream of the turbochargers in the intake passage. In other embodiments, the vehicle system may additionally or alternatively include a low-pressure EGR system which routes exhaust gas from downstream of the turbochargers in the exhaust passage to a location upstream of the turbochargers in the intake passage.

As depicted in FIG. 1, the vehicle system may further include a two-stage turbocharger with the first turbocharger 120 and the second turbocharger 124 arranged in series, each of the turbochargers arranged between the intake passage and the exhaust passage. The two-stage turbocharger increases air charge of ambient air drawn into the intake passage in order to provide greater charge density during combustion to increase power output and/or engine-operating efficiency. The first turbocharger operates at a relatively lower pressure, and includes a first turbine 121 which drives a first compressor 122. The first turbine and the first compressor are mechanically coupled via a first shaft 123. The first turbocharger may be referred to as the "low-pressure stage" of the turbocharger and/or "the low pressure turbocharger". The second turbocharger operates at a relatively higher pressure, and includes a second turbine 125 which drives a second compressor 126. The second turbocharger may be referred to as the "high-pressure stage" of the turbocharger and/or "the high pressure turbocharger". The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In alternate embodiments, the engine system may only include a single stage turbocharger with only a single turbine and single compressor.

In the embodiment shown in FIG. 1, the second turbocharger is provided with a turbine bypass valve (TBV) 128 which allows exhaust gas to bypass the second turbocharger. The turbine bypass valve may be opened, for example, to divert the exhaust gas flow away from and around the second turbine. In this manner, the rotating speed of the second compressor, and thus the boost provided by the turbochargers to the engine may be regulated. For example, by increasing the opening of the TBV, the speed of the turbine and thus the compressor mechanically coupled with the turbine may decrease, thereby decreasing boost provided to the engine. Decreasing boost may decrease an intake manifold pressure (MAP) of the engine.

Additionally, the first turbocharger may also be provided with a turbine bypass valve. In other embodiments, only the first turbocharger may be provided with a turbine bypass valve, or only the second turbocharger may be provided with a turbine bypass valve. Additionally, the second turbocharger may be provided with a compressor bypass valve 129, which allows gas to bypass the second compressor 126 to avoid compressor surge, for example. In some embodiments, the first turbocharger may also be provided with a compressor bypass valve, while in other embodiments, only first turbocharger may be provided with a compressor bypass valve.

The vehicle system further includes the exhaust treatment system coupled in the exhaust passage in order to reduce regulated emissions. As depicted in FIG. 1, the exhaust gas treatment system is disposed downstream of the first turbine of the first (low pressure) turbocharger. In other embodiments, an exhaust gas treatment system may be additionally or alternatively disposed upstream of the first turbocharger. The exhaust gas treatment system may include one or more components. For example, the exhaust gas treatment system may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof. In alternate embodiments, the vehicle system may not include the exhaust aftertreatment system.

The exhaust passage may further include an exhaust gas sensor 190. The exhaust gas sensor measures an exhaust emission value (e.g., level) of the exhaust gas. For example, the exhaust gas sensor may measure a content of the exhaust gas. In one example, the exhaust emission value may be an amount of oxygen and/or NOx in the exhaust gas. As such, the exhaust gas sensor may measure both an oxygen and NOx level of the exhaust gas flowing through the exhaust passage. In another example, the exhaust passage may include two exhaust gas sensors, a first measuring exhaust oxygen content and a second measuring exhaust NOx content. The exhaust gas sensor is shown positioned downstream from the turbochargers and upstream of the exhaust gas treatment system. However, in alternate embodiments the exhaust gas sensor may be positioned in alternate locations in the exhaust passage, such as upstream of the turbochargers or between the two turbocharger stages. The exhaust gas sensor may alternatively be positioned in orificed side-sample lines that bypass the one or more turbines.

In one example, the exhaust gas sensor may be a universal exhaust gas oxygen sensor (UEGO) or another appropriate exhaust constituent sensor.

The vehicle system further includes the control unit 180, which is provided and configured to control various components related to the vehicle system. In one example, the control unit includes a computer control system (e.g., referred to herein as a controller). The control unit further includes non-transitory, computer readable storage media (not shown) including code for enabling on-board monitoring and control of engine operation. The control unit, while overseeing control and management of the vehicle system, may be configured to receive signals from a variety of engine sensors, as further elaborated herein, in order to determine operating parameters and operating conditions, and correspondingly adjust various engine actuators to control operation of the vehicle system. For example, the control unit may receive signals from various engine sensors including sensor 181 arranged in the inlet of the high-pressure turbine, sensor 182 arranged in the inlet of the low-pressure turbine, sensor 183 arranged in the inlet of the low-pressure compressor, sensor 184 arranged in the inlet of the high-pressure compressor, and the exhaust gas sensor. The sensors arranged in the inlets of the turbochargers may detect air temperature and/or pressure. In one example, a pressure difference across the TBV (and high pressure turbine) may be determined based on a difference between turbine inlet pressure (measured by sensor 181) and turbine outlet pressure (measure by sensor 182).

The second turbocharger may also include a speed sensor 191 for measuring turbine speed (e.g., high pressure turbine or turbocharger speed) of the second turbocharger and the first turbocharger may also include a speed sensor 193 for measuring turbine speed of the first turbocharger. It should be noted that turbine speed and turbocharger speed may be used interchangeably throughout the disclosure, as the turbocharger turbine drives the turbocharger compressor. In alternate embodiments, only one of the first or second turbocharger may include a turbocharger (e.g., turbine) speed sensor. In yet another embodiment, if the engine system only includes a single turbocharger, the single turbocharger may include the turbocharger speed sensor. As explained further below, the controller may determine a time-varying speed of the turbocharger based on an output of the turbocharger speed sensor. The controller may not apply a filter to the time-varying speed output by the turbocharger sensor that results in an average speed of the turbocharger. As a result, the turbocharger speed fluctuations corresponding to each exhaust pulse received at the turbine from each cylinder may be preserved and analyzed, as described further below. However, in some embodiments, the controller may apply a notch filter to the output of the turbocharger speed sensor in order to remove the firing frequency (and higher harmonics if necessary) of the engine.

In some embodiments, the engine may include a sensor for measuring peak cylinder pressure. Additional sensors may include, but are not limited to, engine speed, engine load, boost pressure, ambient pressure, exhaust temperature, exhaust pressure, etc. Correspondingly, the control unit may control the vehicle system by sending commands to various components such as traction motors, alternator, cylinder valves, throttle, heat exchangers, wastegates or other valves or flow control elements, etc. For example, the controller may send commands to an actuator of a fuel injector or exhaust valve of an individual cylinder, thereby adjusting operation of the individual cylinder based on the received command.

As introduced above, during operation of the two-stage turbocharger engine system, surge of the high pressure compressor may occur. Surge is defined as when air flow through the turbocharger compressor flows backwards, which causes vibration and an increase in turbocharger speed. Compressor surge is undesirable as it may reduce engine efficiency and result in degradation of turbocharger components. However, detecting compressor surge, particularly of the high pressure stage compressor, is difficult in an engine that includes a two-stage turbocharger (two turbochargers arranged in series, as shown in FIG. 1) and an EGR system. The two-staged turbocharger system produces higher boost than a single-stage system and the high pressure EGR system adds complexity to the air flow control system of the engine. As a result, detecting high pressure compressor surge is difficult, thereby resulting in possible turbocharger component degradation and a decrease in engine efficiency.

A controller of the engine system (e.g., a controller of control unit 180 of FIG. 1) may include non-transitory, computer readable storage media (e.g., memory) including code for enabling on-board monitoring and control of engine operation, as well as running an engine simulation model, on-board the vehicle, during operation of the engine. The engine simulation model may simulate operation of the engine based on measured operating conditions of the engine. For example, the engine simulation model may use current engine operating conditions, which may be measured on-board the engine during engine operation, as inputs and then output different, predicted engine operating parameters. Specifically, the engine simulation model may include a model of the high pressure turbocharger which uses various turbocharger and engine operating parameter inputs (e.g., air pressures and temperatures entering and/or exiting the turbocharger components, as well as engine speed) to predict (e.g., estimate) a speed of the high pressure turbocharger. The engine simulation model may be used for diagnostic purposes, during operation of the engine. The inventors herein have recognized that the high pressure turbocharger speed determined and output by the engine model tracks (e.g., is within a finite threshold of) a measured high pressure turbocharger speed of the high pressure turbocharger when the high pressure compressor is not experiencing surge. However, when the high pressure compressor is experiencing surge (e.g., when surge is occurring during engine operation), the modeled high pressure turbocharger speed, output by the engine simulation model, diverges from the measured (e.g., actual) high pressure turbocharger speed. Thus, by tracking the deviation between the values of the modeled high pressure turbocharger speed and measured high pressure turbocharger speed over time, during engine operation, compressor surge may be detected and one or more actions may be taken in respond to detecting surge, as explained further below with reference to FIG. 4.

An example algorithm including the portion of the engine simulation model used to determine the modeled high pressure turbocharger speed is described below with reference to FIG. 2. For example, the engine model, including the portion that models the high pressure turbocharger speed, may be a physics-based mode that utilizes conservation of mass/energy relationships. The model is a thermodynamic model that takes into account pressures and temperatures into and out of the turbocharger, engine speed, energy across the turbocharger, and a load of the high pressure compressor.

Figure 2:
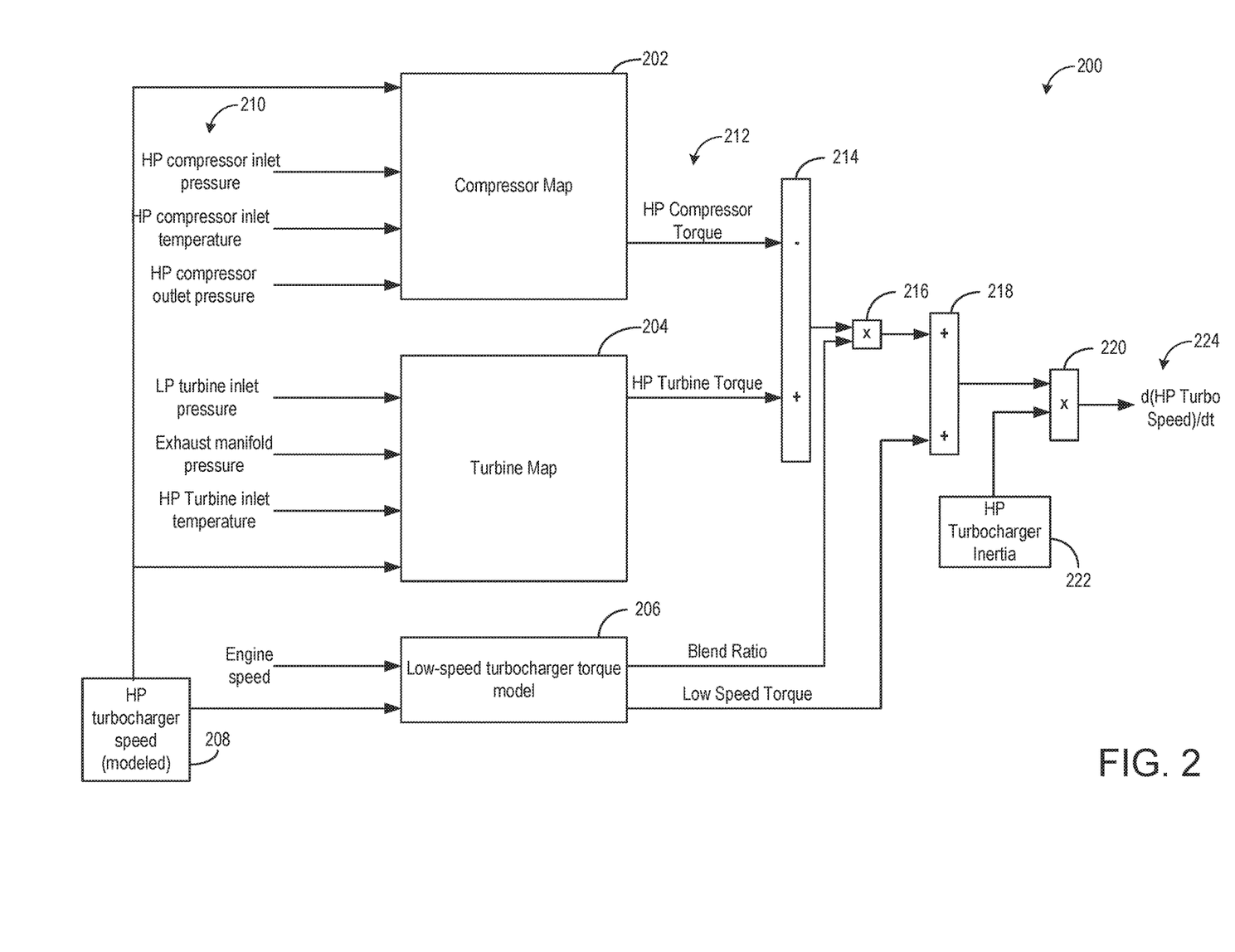
FIG. 2 shows an example block diagram illustrating an algorithm used to model high pressure turbocharger speed of a two-stage turbocharger engine system.

Turning now to FIG. 2, an example block diagram 200 illustrating an algorithm for a model of high pressure turbocharger speed of a high pressure turbocharger of a two-stage turbocharger engine system is shown. The algorithm shown in diagram 200 may be stored in and performed by a control system of a vehicle, such as controller 180 of FIG. 1. Specifically, controller 180 may use the engine operating parameters determined at 402 in method 400 (as described further below with reference to FIG. 4) to determine the rate of change of the high pressure turbocharger speed over time and, ultimately, determine a modeled speed of the high pressure turbocharger for the current engine operating conditions. The modeled speed of the high pressure turbocharger may then be compared to a measured speed of the high pressure turbocharger and discrepancies between these two values may provide an indication of compressor surge, as explained further below with reference to FIGS. 3 and 4. For example, as explained further below, the determined, modeled speed of the high pressure turbocharger may be used in method 400 to indicate surge of the compressor and take corrective action, if applicable.

Diagram 200 illustrates three main parts of the high pressure turbocharger speed model, including a compressor map 202, turbine map 204, and low-speed turbocharger torque model 206. The inputs to the compressor map 202, turbine map 204, and low-speed turbocharger torque model 206 are shown at 210. All of inputs 210 may be current (e.g., actual and not modeled) engine operating conditions of the engine that are estimated and/or measured at the controller of the engine based on signals received from the various sensors of the engine (such as the sensors described herein with reference to FIG. 1). The modeled high pressure turbocharger speed 208 may also be input into each of the compressor map 202, turbine map 204, and low-speed turbocharger torque model 206 and may represent the most recently (e.g., at the previous time point) modeled high pressure turbocharger speed. Each of the maps, via the controller and according to the code of the algorithm, output torque values and/or speed/load values of the corresponding components at 212. These values are then balanced against one another, as described further below.

Looking first at the compressor map 202, the inputs 210 include the modeled high pressure turbocharger speed 208, a compressor inlet pressure (e.g., air pressure of intake air entering the high pressure compressor of the high pressure turbocharger), a compressor inlet temperature (e.g., the temperature of intake air entering the high pressure compressor), and compressor outlet pressure (e.g., air pressure of compressed intake air exiting the high pressure compressor). The algorithm of the model at the compressor map 202 then takes these inputs and outputs a corresponding torque of the high pressure compressor (HP compressor torque).

At the turbine map 204, the inputs 210 include the modeled high pressure turbocharger speed 208, a low pressure turbine inlet pressure (e.g., air pressure of exhaust gas entering the low pressure turbine, which is approximately the same as the pressure of exhaust gas exiting the high pressure turbine), an exhaust manifold pressure (e.g., pressure of exhaust gases in the exhaust manifold, which enters the high pressure turbine), and a high pressure turbine inlet temperature (e.g., temperature of exhaust gases entering the high pressure turbine). The algorithm of the model at the turbine map 204 then takes these inputs and outputs a corresponding torque of the high pressure turbine (HP turbine torque).

At the low-speed turbocharger torque model 206, the inputs 210 include the modeled high pressure turbocharger speed 208 and engine speed (e.g., current speed, RPM, of the engine during engine operation). The model at 206 represents low-speed operation of the high pressure turbocharger where the high pressure turbocharger is not contributing usable boost, but rather is "freewheeling". In this way, the turbocharger is not actively producing boost pressure. The algorithm of the model at the low-speed turbocharger torque model 206 takes the listed inputs and outputs a corresponding blend ratio and a corresponding low-speed torque model value. In one example, the blend ratio may be a number (e.g., fraction) in a range from 0 to 1. When the turbocharger is operating with the low-speed model, the blend ratio may be near zero so that the low-speed torque dominates. However, at higher boost levels, the blend ratio may be closer to 1 so that the higher-boost physics dominates the model.

At 214, the output HP compressor torque is subtracted from the output HP turbine torque. In this way, the model is working across the compressor map (e.g., map of pressure ratio across HP compressor vs. flow through HP compressor) to determine how much torque is needed to make the boost that the controller is experiencing (e.g., the amount of boost measured and/or estimated based on current engine operating conditions, including the compressor outlet pressure). At summation block 214, the higher load model of the turbine torque is generated. Then, at 216, the higher load model of the turbine torque is blended via the blend ratio discussed above. At 218, the torque contributions from the higher load model and the lower-speed model are added together. The resulting torque, representing the amount of torque being generated on the turbine side from the energy in the exhaust, is then multiplied at 220 by the amount of inertia of the high pressure turbocharger to determine the speed change of the high pressure turbocharger at 224. The resulting value at 224 may also be referred to as the rate of change of the high pressure turbocharger speed over time. The output change in high pressure turbocharger speed is then added or subtracted (depending on the sign) to the previously modeled high pressure turbocharger speed to obtain a new modeled high pressure turbocharger speed which is used as the new input to the model at 208. As seen from the model represented by diagram 200, if there is a positive amount of turbine energy compared to the compressor, the high pressure turbocharger is going to speed up (e.g., speed will increase).

Though the model described above with reference to FIG. 2 is a model of a speed of the high pressure turbocharger, in alternate embodiments, a similar model may be used for the low pressure turbocharger to model changes in low pressure turbocharger speed. For example, the inputs shown in FIG. 2 may be replaced with inputs relative to the low pressure turbocharger (e.g., inlet and outlet pressures and temperatures to the low pressure turbocharger). In yet other embodiments, a similar model may be implemented in a single-stage turbocharger engine system to model changes in the single-stage turbocharger speed.

FIG. 3 shows an example graph 300 of a measured high pressure turbocharger speed 302 and a modeled high pressure turbocharger speed 304 of a high pressure turbocharger (e.g., high pressure turbocharger 124 of FIG. 1) during operation of an engine. As described above, the engine system (such as the engine system of FIG. 1) may include a two-stage turbocharger including a high pressure turbocharger and low pressure turbocharger arranged in series with one another. The engine system may further include a high pressure EGR system. The modeled high pressure turbocharger speed 304 may be modeled according to an engine simulation model, such as the model shown in FIG. 2, as discussed above. The measured high pressure turbocharger speed 302 may be estimated and/or measured from one or more engine sensors. In one example, the measured high pressure speed 302 may be measured via a speed sensor (e.g., speed sensor 191 shown in FIG. 1) coupled to the high pressure turbocharger. Graph 300 shows high pressure turbocharger speed on the y-axis and time on the x-axis. Thus, graph 300 illustrates changes in the measured high pressure turbocharger speed 302 compared to changes in the modeled high pressure turbocharger speed 304, over time, during operation of the engine. In this way, the modeled high pressure turbocharger speed 304 may be continuously modeled during engine operation, at the same time as acquiring the measured high pressure turbocharger speed 302.

Prior to time t1, the modeled high pressure turbocharger speed 304 tracks the measured high pressure turbocharger speed 302 relatively closely. At time t1, a compressor surge event of the high pressure compressor occurs. As a result, the high pressure turbocharger speeds up. This is reflected by the relatively sharp increase in the measured high pressure turbocharger speed 302 after time t1. At the same time as the increase in the measured high pressure turbocharger speed 302, the modeled high pressure turbocharger speed 304 decreases. In this way, during the surge event, the modeled high pressure turbocharger speed 304 trends in the opposite direction as the actual (measure) high pressure turbocharger speed, by the first divergence amount 306. The first divergence amount 306 represents a disconnect between the model and the physics of the surge event. Thus, the model of the high pressure turbocharger speed, which under non-surge conditions provides a relatively accurate estimate of the actual high pressure turbocharger speed (e.g., is less than a threshold amount different than the actual, measured value) provides a clear signature of the compressor surge event. The first divergence amount 306 may represent the delta, or difference, between the measured and modeled high pressure turbocharger speeds and may be greater than a threshold amount. The threshold amount may be a non-zero amount that represents an acceptable amount of error or variation between the measured and modeled high pressure turbocharger speed values and which may occur during non-surge conditions. In another example, the threshold amount may be at least greater than an expected increase in the measured high pressure turbocharger speed during the surge event. In yet another example, the threshold amount may be 1.5 times greater than an expected increase in the measured high pressure turbocharger speed during the surge event (e.g., since the modeled high pressure turbocharger speed decreases by a similar amount as the measured high pressure turbocharger speed increases during the surge, as seen between times t1 and t2).

At time t2, the high pressure compressor stops surging and the modeled high pressure turbocharger speed 304 returns to a level that is within the threshold amount of the measured high pressure turbocharger speed 302. Between times t2 and t3 there are no compressor surge events. As a result, the modeled high pressure turbocharger speed 304 tracks the measured high pressure turbocharger speed 302 such that the difference between the measured and modeled turbocharger speeds (e.g., absolute value of the difference, or the magnitude of the delta) are maintained within the threshold amount of one another.

At time t3, another surge event of the high pressure compressor occurs. As a result, the measured high pressure turbocharger speed 302 increases while, at the same time, the modeled high pressure turbocharger speed 304 decreases. During the second surge event, between times t3 and t4, the peak values of the measured high pressure turbocharger speed 302 and modeled high pressure turbocharger speed 304 differ by a second divergence amount 308. The second divergence amount 308 is greater than the threshold amount, but may also be greater than the first divergence amount 306. In this way, based on the conditions of the surge event, the magnitude of the difference between the measured and modeled high pressure turbocharger speeds may differ, but in each case, the difference may be greater than the threshold amount and the measured and modeled high pressure turbocharger curves diverge in opposite directions.

After time t4, the compressor stops surging and the modeled high pressure turbocharger speed 304 returns to being relatively the same as the measured high pressure turbocharger speed 302. In this way, by monitoring the difference between the measured high pressure turbocharger speed and the modeled high pressure turbocharger speed, during operation of the engine, surge events may be detected. As shown in FIG. 3, the modeled high pressure turbocharger speed and the difference between the modeled and measured high pressure turbocharger speeds are not based on high frequency oscillations of the high pressure turbocharger. Rather, the difference is a regular delta (e.g., difference) between the two, time-varying curves shown in FIG. 3.

FIG. 4 shows a flow chart of a method 400 for detecting surge in a high pressure turbocharger system. The high pressure turbocharger system, such as the high pressure turbocharger 124 of FIG. 1, may be included in an engine system with a low pressure turbocharger and high pressure EGR system (such as the system shown in FIG. 1). Instructions for carrying out method 400 and the rest of the methods discussed herein may be executed by a controller (e.g., controller 180 of FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 400 begins at 402 by estimating and/or measuring engine operating conditions. Engine operating conditions may include an inlet pressure and temperature to each of the high pressure compressor, high pressure turbine, low pressure compressor, and low pressure turbine, an outlet pressure and temperature to each of the high pressure compressor, high pressure turbine, low pressure compressor, and low pressure turbine, a speed of the high pressure turbocharger, a speed of the low pressure turbocharger, engine speed, engine load, notch level, and the like. For example, the controller may determine the measured high pressure turbocharger speed (e.g., the high pressure turbocharger speed 302 shown in FIG. 3) based on a signals received from a speed sensor coupled to the high pressure turbocharger (e.g., speed sensor 191 shown in FIG. 1).

At 404, method 400 includes determining the modeled high pressure turbocharger speed (e.g., modeled high pressure turbocharger speed 304 shown in FIG. 3) and the measured high pressure turbocharger speed (e.g., measured high pressure turbocharger speed 302 shown in FIG. 3, as obtained at 402). Determining the modeled high pressure turbocharger speed may include inputting the pressure and temperature conditions of the turbochargers and engine speed obtained at 402 into the high pressure turbocharger model of the engine simulation model at the controller. The high pressure turbocharger model of the engine simulation model may be the same or similar to the model discussed above with reference to FIG. 2. For example, the controller may have instructions, stored as executable code on memory of the controller, for inputting the necessary engine operating conditions into the model, running the model on the input engine operating conditions, and outputting a modeled change in high pressure turbocharger speed which may then be added to a previous value of the modeled high pressure turbocharger speed to obtain a current, modeled value of the high pressure turbocharger speed.

At 406, the method includes determining whether the measured high pressure turbocharger speed is deviating from the modeled high pressure turbocharger speed (or vice versa) by a threshold. For example, for a same time point (e.g., current time), the controller may compare the measured and modeled values of the high pressure turbocharger speed. If an absolute value (e.g., magnitude) of the difference between the measured and modeled high pressure turbocharger speed values differ by greater than a non-zero threshold, the controller may determine the values deviate my more than the threshold and the method continues to 410. This may also be referred to as an error between the measured and modeled high pressure turbocharger speeds being greater than the threshold. In alternate embodiments, the method at 406 may include the controller determining whether a sharp (e.g., instantaneous) sign change of the measured and modeled high pressure turbocharger speed values differ for a threshold duration. In another embodiment, the method at 406 may include determining a derivative of each of the measured and modeled high pressure turbocharger curves and then determining whether these two derivatives are greater than a threshold and/or have different signs over a threshold duration. In still another embodiment, the method may include determining whether each of the measured and modeled high pressure turbocharger speeds change by a threshold amount within a finite, threshold duration, and the sign of each of the changes is different than one another (e.g., the measured speed experiences a positive spike while the modeled speed experiences a negative spike).

If the measured and modeled high pressure turbocharger speeds do not differ by the threshold, or do meet one of the other conditions described above with reference to 406, the method continues to 408 to continue current engine operation (without taking any corrective actions for surge) and to not log a surge event. In this way, the controller may determine at 408 that no compressor surge event of the high pressure compressor is occurring.

Alternatively at 406, if the measured and modeled high pressure turbocharger speeds do differ by the threshold, or meet one of the other conditions described above with reference to 406, the method continues to 410 to indicate surge of the compressor of the high pressure turbocharger (e.g., of the high pressure compressor). As one example, indicating surge of the high pressure compressor may include notifying an operator of the vehicle via an audible or visual signal that surge is occurring. As another example, indicating surge at 410 may include logging the surge event in the memory of the controller. This may include incrementing a surge counter in the memory of the controller. As such, the controller may track how many surge events occur during engine operation, which may be used for diagnosis and repair of the engine when the engine is off-line. Similarly, indicating surge at 410 may include setting a diagnostic code at the controller.

At 412, the method may optionally include taking corrective action based on the indicated surge. Taking corrective action may include adjusting an engine operating parameter and/or adjusting an engine actuator to reduce or stop compressor surge. For example, in response to detecting surge, the method at 412 may include opening a compressor bypass valve (e.g., compressor bypass valve 129) arranged in a bypass passage around the high pressure compressor. As one example, the controller may actuate the compressor bypass valve to move into an open position where air may recirculate from downstream of the compressor to upstream of the compressor. In another example, the method at 412 may include decreasing an EGR rate and/or increasing engine speed.

In alternate embodiments, method 400 may also be implemented to detect surge in a low pressure compressor or in a compressor of a single-stage turbocharger system. For example, at 404, the method may include modeling low pressure turbocharger speed (using a model similar to the model shown in FIG. 2, for a low pressure turbocharger) and measuring the low pressure turbocharger speed. In this way, surge may be detected in a variety of turbochargers by detecting deviations between a measured and modeled turbocharger speed.

In this way, compressor surge may be detected in an engine system including a two-stage turbocharger system (e.g., two turbochargers arranged in series with one another). The engine system may further include a high pressure EGR system. Specifically, an engine simulation model that is run on-board a vehicle, while an engine of the vehicle is operating, includes a model for estimating a speed of the high pressure turbocharger using current engine operating conditions (e.g., temperature and pressure conditions of the turbochargers and engine speed). The modeled high pressure turbocharger speed may be continuously updated as engine operating conditions change, during engine operation. During non-surge conditions, while the engine is operating without the high pressure compressor surging, the modeled high pressure turbocharger speed may track a measured high pressure turbocharger speed (e.g., the modeled speed may be within a threshold error amount of the measured speed). As such, during non-surge conditions, the modeled high pressure speed reflects the actual speed of the high pressure turbocharger. However, when the high pressure compressor experiences surge, the modeled high pressure turbocharger speed deviates from the measured high pressure turbocharger speed by a threshold amount. Specifically, responsive to compressor surge, the measured (and actual) high pressure turbocharger speed increases (e.g., experiences a positive spike in speed) while the modeled high pressure turbocharger speed decreases (e.g., experiences a negative spike in speed). This deviation may be detected and then, in response to the detection, surge may be indicated (e.g., to a vehicle operator) and/or one or more engine operating parameters may be adjusted to reduce surge. This method provides a way to more easily and accurately detect surge in an engine system for which it may otherwise be difficult to detect surge events (e.g., in an engine system include two turbochargers arranged in series and a high pressure EGR system). Thus, the technical effect of: in response to a time-based difference between a modeled high pressure turbocharger speed and a measured high pressure turbocharger speed increasing by a threshold amount, the modeled high pressure turbocharger speed modeled during operation of an engine and tracking changes in speed of the high pressure turbocharger, indicating surge of the high pressure turbocharger, is to more easily detect surge events and, as a result, reduce turbocharger component degradation while increasing engine efficiency.

As one embodiment, a system, comprises: an engine coupled to a low pressure turbocharger and a high pressure turbocharger; and a controller with non-transitory instructions stored in memory that when executed during operation of the engine cause the controller to: indicate an occurrence of surge of the high pressure turbocharger in response to a deviation of a modeled speed of the high pressure turbocharger from a measured speed of the high pressure turbocharger by a threshold amount, where the modeled speed tracks the measured speed during non-surge conditions, as engine operating conditions change. In a first example of the system, the system further comprises a high pressure exhaust gas recirculation (EGR) system coupled between an exhaust of the engine and an intake passage of the engine, downstream of a compressor of the high pressure turbocharger. A second example of the system optionally includes the first example and further includes, wherein the deviation of the modeled speed from the measured speed by the threshold amount includes the modeled speed decreasing while the measured speed increases for a threshold duration of time. A third example of the system optionally includes one or more of the first and second examples and further includes, wherein the deviation of the modeled speed from the measured speed by the threshold amount includes a magnitude of a difference between the modeled speed and the measured speed being greater than the threshold amount. A fourth example of the system optionally includes one or more of the first through third examples and further includes, wherein the modeled speed is modeled using a physics-based model of an air handling system of the engine, the model stored in memory of the controller and wherein the instructions further cause the controller to execute the model during engine operation using current pressure and temperature conditions of the high pressure turbocharger as inputs to the model and output the modeled speed of the high pressure turbocharger. A fifth example of the system optionally includes one or more of the first through fourth examples and further includes, wherein the instructions further cause the controller to update the output modeled speed over time, as engine operating conditions change, and continuously compare the modeled speed to the measured speed. A sixth example of the system optionally includes one or more of the first through fifth examples and further includes, wherein the instructions further cause the controller to adjust an engine actuator in response to indicating the occurrence of surge and wherein the low pressure turbocharger is arranged in series with the high pressure turbocharger. A seventh example of the system optionally includes one or more of the first through sixth examples and further includes, wherein the engine actuator includes a compressor bypass valve arranged in a bypass passage around a compressor of the high pressure turbocharger and wherein the instructions further cause the controller to open the compressor bypass valve responsive to the indicated occurrence of surge. An eighth example of the system optionally includes one or more of the first through seventh examples and further includes a speed sensor coupled to the high pressure turbocharger and wherein the instructions further cause the controller to determine the measured speed of the high pressure turbocharger from outputs of the speed sensor. A ninth example of the system optionally includes one or more of the first through eighth embodiments and further includes wherein the system is a locomotive system and wherein the engine is coupled to the low pressure turbocharger and the high pressure turbocharger in the locomotive.

As another embodiment, a method comprises: in response to an absolute value of a time-based difference between a modeled high pressure turbocharger speed and a measured high pressure turbocharger speed increasing by a threshold amount, the modeled high pressure turbocharger speed modeled during operation of an engine and tracking changes in speed of the high pressure turbocharger when surge of the high pressure turbocharger is not occurring, indicating surge of the high pressure turbocharger, where the high pressure turbocharger is included in an engine system which further includes a low pressure turbocharger. In a first example of the method, the method further includes adjusting an engine operating parameter in response to the indicating surge. In a second example of the method, the method optionally includes the first example and further includes, wherein the indicating surge includes notifying an operator of a vehicle in which the engine is installed that surge is occurring via a visual and/or audible alert. A third example of the method optionally includes one or more of the first and second examples, and further includes, wherein the indicating surge includes logging the indicated surge as a surge event of the high pressure turbocharger at a controller and further comprising, for each subsequent indication of surge, incrementing a count of surge events of a surge counter at the controller. A fourth example of the method optionally includes one or more of the first through third examples, and further includes, wherein the time-based difference between the modeled high pressure turbocharger speed and the measured high pressure turbocharger speed is a difference between a modeled high pressure turbocharger speed value and a measured high pressure turbocharger speed value at a current time point during engine operation and is not based on high frequency oscillations of the high pressure turbocharger. A fifth example of the method optionally includes one or more of the first through fourth examples, and further includes, wherein the measured high pressure turbocharger speed is measured via a speed sensor coupled to the high pressure turbocharger and wherein the modeled high pressure turbocharger speed is determined during engine operation via an engine simulation model stored and run at a controller using current operating conditions as inputs. A sixth example of the method optionally includes one or more of the first through fifth examples, and further includes, wherein the current operating conditions used as inputs to the engine simulation model to determine the modeled high pressure turbocharger speed include pressures and temperatures into and out of a compressor and turbine of the high pressure turbocharger and engine speed. A seventh example of the method optionally includes one or more of the first through sixth examples, and further includes indicating surge of the high pressure turbocharger in response to a derivative of each of the modeled high pressure turbocharger speed and the measured high pressure turbocharger speed changing by a threshold amount and a sign of the derivative of each of the modeled high pressure turbocharger speed and the measured high pressure turbocharger speed being different. An eighth example of the method optionally includes one or more of the first through seventh examples, and further includes, wherein the modeled high pressure turbocharger speed and the measured high pressure turbocharger speed are time-varying functions based on estimated and/or measured operating conditions of the high pressure turbocharger.

As yet another embodiment, a method, comprises: comparing a modeled speed of a turbocharger, modeled during operation of an engine, to a measured speed of the turbocharger, the modeled speed being within a threshold of the measured speed during non-surge conditions of the turbocharger; and indicating surge of the turbocharger in response to the modeled speed decreasing while the measured speed increases and an absolute value of a difference between the modeled speed and the measured speed being greater than the threshold for a predetermined duration of time. In a first example of the method, the method further comprises, in response to indicating surge, logging a surge event at a controller of the engine and adjusting an engine operating parameter of the engine to reduce surge and wherein the turbocharger is a high pressure turbocharger arranged in series with a lower pressure turbocharger. In a second example of the method, the method optionally includes the first method and further includes, wherein the method is a method for locomotive engine control, and wherein the turbocharger is a high pressure turbocharger and the engine further includes a low pressure turbocharger.

As still another embodiment, a method for engine control comprises: in response to an absolute value of a time-based difference between a modeled turbocharger speed and a measured turbocharger speed increasing by a threshold amount, the modeled turbocharger speed modeled during operation of an engine and tracking changes in speed of the turbocharger when surge of the turbocharger is not occurring, indicating surge of the turbocharger. In a first example of the method, the method further includes adjusting an engine operating parameter in response to the indicating surge. In a second example of the method, the method optionally includes the first example and further includes, wherein the indicating surge includes notifying an operator of a vehicle in which the engine is installed that surge is occurring via a visual and/or audible alert. A third example of the method optionally includes one or more of the first and second examples, and further includes, wherein the indicating surge includes logging the indicated surge as a surge event of the turbocharger at a controller and further comprising, for each subsequent indication of surge, incrementing a count of surge events of a surge counter at the controller. A fourth example of the method optionally includes one or more of the first through third examples, and further includes, wherein the time-based difference between the modeled turbocharger speed and the measured turbocharger speed is a difference between a modeled turbocharger speed value and a measured turbocharger speed value at a current time point during engine operation and is not based on high frequency oscillations of the turbocharger. A fifth example of the method optionally includes one or more of the first through fourth examples, and further includes, wherein the measured turbocharger speed is measured via a speed sensor coupled to the turbocharger and wherein the modeled turbocharger speed is determined during engine operation via an engine simulation model stored and run at a controller using current operating conditions as inputs. A sixth example of the method optionally includes one or more of the first through fifth examples, and further includes, wherein the current operating conditions used as inputs to the engine simulation model to determine the modeled turbocharger speed include pressures and temperatures into and out of a compressor and turbine of the turbocharger and engine speed. A seventh example of the method optionally includes one or more of the first through sixth examples, and further includes indicating surge of the turbocharger in response to a derivative of each of the modeled turbocharger speed and the measured turbocharger speed changing by a threshold amount and a sign of the derivative of each of the modeled turbocharger speed and the measured turbocharger speed being different. An eighth example of the method optionally includes one or more of the first through seventh examples, and further includes, wherein the modeled turbocharger speed and the measured turbocharger speed are time-varying functions based on estimated and/or measured operating conditions of the turbocharger.

In another representation, a system, comprises: an engine coupled to a low pressure turbocharger and a high pressure turbocharger; and a controller with non-transitory instructions stored in memory that when executed during operation of the engine cause the controller to: indicate an occurrence of surge of the low pressure turbocharger in response to a deviation of a modeled speed of the low pressure turbocharger from a measured speed of the low pressure turbocharger by a threshold amount, where the modeled speed tracks the measured speed during non-surge conditions, as engine operating conditions change. In one example, the deviation of the modeled speed from the measured speed by the threshold amount includes the modeled speed decreasing while the measured speed increases for a threshold duration of time. In another example, the deviation of the modeled speed from the measured speed by the threshold amount includes a magnitude of a difference between the modeled speed and the measured speed being greater than the threshold amount. In yet another example, the modeled speed is modeled using a physics-based model of an air handling system of the engine, the model stored in memory of the controller and wherein the instructions further cause the controller to execute the model during engine operation using current pressure and temperature conditions of the low pressure turbocharger as inputs to the model and output the modeled speed of the low pressure turbocharger. In one example, the instructions further cause the controller to update the output modeled speed over time, as engine operating conditions change, and continuously compare the modeled speed to the measured speed. In another example, the instructions further cause the controller to adjust an engine actuator in response to indicating the occurrence of surge and wherein the low pressure turbocharger is arranged in series with the high pressure turbocharger. In one example, the engine actuator includes a compressor bypass valve arranged in a bypass passage around a compressor of the low pressure turbocharger and wherein the instructions further cause the controller to open the compressor bypass valve responsive to the indicated occurrence of surge. The system may further comprise a speed sensor coupled to the low pressure turbocharger and wherein the instructions further cause the controller to determine the measured speed of the low pressure turbocharger from outputs of the speed sensor.

In yet another representation, a system, comprises: an engine coupled to a turbocharger; and a controller with non-transitory instructions stored in memory that when executed during operation of the engine cause the controller to: indicate an occurrence of surge of the turbocharger in response to a deviation of a modeled speed of the turbocharger from a measured speed of the turbocharger by a threshold amount, where the modeled speed tracks the measured speed during non-surge conditions, as engine operating conditions change. In one example, the deviation of the modeled speed from the measured speed by the threshold amount includes the modeled speed decreasing while the measured speed increases for a threshold duration of time. In another example, the deviation of the modeled speed from the measured speed by the threshold amount includes a magnitude of a difference between the modeled speed and the measured speed being greater than the threshold amount. In yet another example, the modeled speed is modeled using a physics-based model of an air handling system of the engine, the model stored in memory of the controller and wherein the instructions further cause the controller to execute the model during engine operation using current pressure and temperature conditions of the turbocharger as inputs to the model and output the modeled speed of the turbocharger. In one example, the instructions further cause the controller to update the output modeled speed over time, as engine operating conditions change, and continuously compare the modeled speed to the measured speed. In another example, the instructions further cause the controller to adjust an engine actuator in response to indicating the occurrence of surge. In one example, the engine actuator includes a compressor bypass valve arranged in a bypass passage around a compressor of the turbocharger and wherein the instructions further cause the controller to open the compressor bypass valve responsive to the indicated occurrence of surge. The system may further comprise a speed sensor coupled to the turbocharger and wherein the instructions further cause the controller to determine the measured speed of the turbocharger from outputs of the speed sensor.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   an engine coupled to a low pressure turbocharger and a high pressure turbocharger in a vehicle; and
   a controller with non-transitory instructions stored in memory that when executed during operation of the engine cause the controller to:
   indicate an occurrence of surge of the high pressure turbocharger in response to a deviation of a modeled speed of the high pressure turbocharger from a measured speed of the high pressure turbocharger by a threshold amount, where the modeled speed tracks the measured speed during non-surge conditions, as engine operating conditions change, wherein the deviation of the modeled speed from the measured speed includes the modeled speed and the measured speed trending in opposite directions, and the deviation of the modeled speed from the measured speed by the threshold amount includes the modeled speed decreasing while the measured speed increases for a threshold duration.

2. The system of claim 1, further comprising a high pressure exhaust gas recirculation (EGR) system coupled between an exhaust of the engine and an intake passage of the engine, downstream of a compressor of the high pressure turbocharger.

3. The system of claim 1, wherein the deviation of the modeled speed from the measured speed by the threshold amount further includes a magnitude of a difference between the modeled speed and the measured speed being greater than the threshold amount.

4. The system of claim 1, wherein the modeled speed is modeled using a physics-based model of an air handling system of the engine, the model stored in the memory of the controller and wherein the instructions further cause the controller to execute the model during engine operation using current pressure and temperature conditions of the high pressure turbocharger as inputs to the model and output the modeled speed of the high pressure turbocharger.

5. The system of claim 4, wherein the instructions further cause the controller to update the output modeled speed over time, as engine operating conditions change, and continuously compare the modeled speed to the measured speed.

6. The system of claim 1, wherein the instructions further cause the controller to adjust an engine actuator in response to indicating the occurrence of surge and wherein the low pressure turbocharger is arranged in series with the high pressure turbocharger.

7. The system of claim 6, wherein the engine actuator includes a compressor bypass valve arranged in a bypass passage around a compressor of the high pressure turbocharger and wherein the instructions further cause the controller to open the compressor bypass valve responsive to the indicated occurrence of surge.

8. The system of claim 1, further comprising a speed sensor coupled to the high pressure turbocharger and wherein the instructions further cause the controller to determine the measured speed of the high pressure turbocharger from outputs of the speed sensor.

9. A method for engine control, comprising:
   in response to a modeled turbocharger speed and a measured turbocharger speed trending in opposite directions with the modeled turbocharger speed decreasing while the measured turbocharger speed increases for a threshold duration and an absolute value of a difference between the modeled turbocharger speed and the measured turbocharger speed increasing by a threshold amount, the modeled turbocharger speed modeled during operation of an engine and tracking changes in speed of the turbocharger when surge of the turbocharger is not occurring, indicating surge of the turbocharger.

10. The method of claim 9, further comprising adjusting an engine operating parameter in response to the indicating surge.

11. The method of claim 9, wherein the indicating surge includes notifying an operator of a vehicle in which the engine is installed that surge is occurring via a visual and/or audible alert.

12. The method of claim 9, wherein the indicating surge includes logging the indicated surge as a surge event of the turbocharger at a controller and further comprising, for each subsequent indication of surge, incrementing a count of surge events of a surge counter at the controller.

13. The method of claim 9, wherein the time-based difference between the modeled turbocharger speed and the measured turbocharger speed is a difference between a modeled turbocharger speed value and a measured turbocharger speed value at a current time point during engine operation and is not based on high frequency oscillations of the turbocharger.

14. The method of claim 9, wherein the measured turbocharger speed is measured via a speed sensor coupled to the turbocharger and wherein the modeled turbocharger speed is determined during engine operation via an engine simulation model stored and run at a controller using current operating conditions as inputs.

15. The method of claim 14, wherein the current operating conditions used as inputs to the engine simulation model to determine the modeled turbocharger speed include pressures and temperatures into and out of a compressor and turbine of the turbocharger and engine speed.

16. The method of claim 9, further comprising indicating surge of the turbocharger in response to a derivative of each of the modeled turbocharger speed and the measured turbocharger speed changing by a threshold amount and a sign of the derivative of each of the modeled turbocharger speed and the measured turbocharger speed being different.

17. The method of claim 9, wherein the modeled turbocharger speed and the measured turbocharger speed are time-varying functions based on estimated and/or measured operating conditions of the turbocharger.

18. A method for engine control, comprising:
comparing a modeled speed of a turbocharger, modeled during operation of an engine, to a measured speed of the turbocharger, the modeled speed being within a threshold of the measured speed during non-surge conditions of the turbocharger; and
indicating surge of the turbocharger in response to the modeled speed and the measured speed trending in opposite directions with the modeled speed decreasing while the measured speed increases and an absolute value of a difference between the modeled speed and the measured speed being greater than the threshold for a predetermined duration of time.

19. The method of claim 18, further comprising, in response to indicating surge, logging a surge event at a controller of the engine and adjusting an engine operating parameter of the engine to reduce surge, and wherein the turbocharger is a high pressure turbocharger that is arranged in series with a lower pressure turbocharger.

* * * * *